(12) United States Patent
Menendez

(10) Patent No.: US 7,646,980 B1
(45) Date of Patent: Jan. 12, 2010

(54) VARIABLE SPECTRAL PHASE ENCODER/DECODER BASED ON DECOMPOSITION OF HADAMARD CODES

(75) Inventor: Ronald C. Menendez, Chatham, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 137 days.

(21) Appl. No.: 11/429,686

(22) Filed: May 8, 2006

(51) Int. Cl.
*H04J 14/00* (2006.01)
*H04B 10/04* (2006.01)
*H04L 9/00* (2006.01)
(52) U.S. Cl. .................. 398/77; 398/188; 380/256
(58) Field of Classification Search ............. 398/77, 398/78, 79, 185, 188, 190; 359/279; 380/256
See application file for complete search history.

(56) References Cited

U.S. PATENT DOCUMENTS 6,025,944 A * 2/2000 Mendez et al. ............. 398/78
6,236,483 B1 * 5/2001 Dutt et al. ................. 398/141
2007/0280697 A1 * 12/2007 Menendez ................. 398/140

OTHER PUBLICATIONS

Experimental demonstration of bipolar optical CDMA system using a balanced transmitter and complementary spectral encoding; Lam et al.; Photonics Technology Letters, IEEE; vol. 10, Issue 10, Oct. 1998, pp. 1504-1506.*
International Search Report, dated Jun. 4, 2008 (2 pages).
Lam et al., "Experimental demonstration of bipolar optical CDMA system using a balanced transmitter and completementary spectral encoding," Photonics Technology Letters, IEEE; vol. 10, Issue 10, Oct. 1998, pp. 1504-1506.

* cited by examiner

*Primary Examiner*—Nathan M Curs
(74) *Attorney, Agent, or Firm*—Philip J. Feig

(57) ABSTRACT

The invention is directed toward a variable spectral phase encoder. The variable spectral phase encoder includes a plurality of switches and at least one encoder. The encoder is coupled between a first switch and second switch among the plurality of switches. The first switch selectively routes an optical signal to some combination of fixed encoders such that their collective product applies one of the Hadamard sequences to the optical signal.

4 Claims, 5 Drawing Sheets

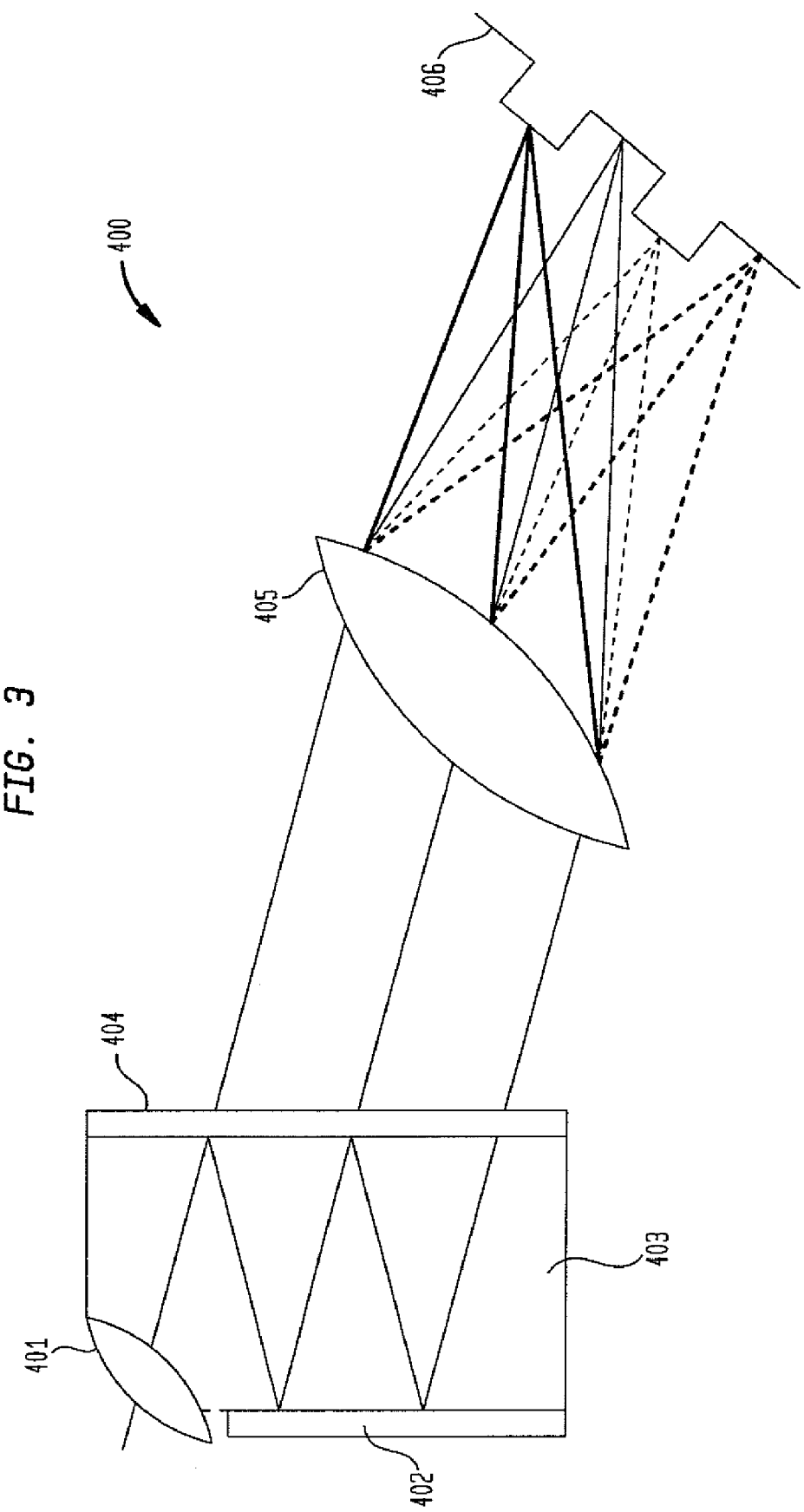

VARIABLE SPECTRAL PHASE ENCODER/DECODER BASED ON DECOMPOSITION OF HADAMARD CODES

STATEMENT REGARDING FEDERALLY SPONSORED RESEARCH

Funding for research was partially provided by the Defense Advanced Research Projects Agency under federal contract MDA972-03-C-0078. The federal government has certain rights in this invention.

FIELD OF THE INVENTION

The present invention relates to optical communication and, more particularly, to a dynamic encoder/decoder suitable for use in optical code division multiple access (OCDMA) communication networks.

BACKGROUND OF THE INVENTION

Various communications schemes have been used to increase data throughput and to decrease data error rates as well as to generally improve the performance of communications channels. As an example, frequency division multiple access ("FDMA") employs multiple data streams that are assigned to specific channels disposed at different frequencies of the transmission band. Alternatively, time division multiple access ("TDMA") uses multiple data streams that are assigned to different timeslots in a single frequency of the transmission band. FDMA and TDMA are quite limited in the number of users and/or the data rates that can be supported for a given transmission band.

In many communication architectures, code division multiple access (CDMA) has supplanted FDMA and TDMA. CDMA is a form of spread spectrum communications that enables multiple data streams or channels to share a single transmission band at the same time. The CDMA format is akin to a cocktail party in which multiple pairs of people are conversing with one another at the same time in the same room. Ordinarily, it is very difficult for one party in a conversation to hear the other party if many conversations occur simultaneously. For example, if one pair of speakers is excessively loud, their conversation will drown out the other conversations. Moreover, when different pairs of people are speaking in the same language, the dialogue from one conversation may bleed into other conversations of the same language, causing miscommunication. In general, the cumulative background noise from all the other conversations makes it harder for one party to hear the other party speaking. It is therefore desirable to find a way for everyone to communicate at the same time so that the conversation between each pair, i.e., their "signal", is clear while the "noise" from the conversations between the other pairs is minimized.

The CDMA multiplexing approach is well known and is explained in detail, e.g., in the text "CDMA: Principles of Spread Spectrum Communication," by Andrew Viterbi, published in 1995 by Addison-Wesley. Basically, in CDMA, the bandwidth of the data to be transmitted (user data) is much less than the bandwidth of the transmission band. Unique "pseudonoise" keys are assigned to each channel in a CDMA transmission band. The pseudonoise keys are selected to mimic Gaussian noise (e.g., "white noise") and are also chosen to be maximal length sequences in order to reduce interference from other users/channels. One pseudonoise key is used to modulate the user data for a given channel. This modulation is equivalent to assigning a different language to each pair of speakers at a party.

During modulation, the user data is "spread" across the bandwidth of the CDMA band. That is, all of the channels are transmitted at the same time in the same frequency band. This is equivalent to all of the pairs of partygoers speaking at the same time. The introduction of noise and interference from other users during transmission is inevitable (collectively referred to as "noise"). Due to the nature of the pseudonoise key, the noise is greatly reduced during demodulation relative to the user's signal because when a receiver demodulates a selected channel, the data in that channel is "despread" while the noise is not "despread." Thus, the data is returned to approximately the size of its original bandwidth, while the noise remains spread over the much larger transmission band. The power control for each user can also help to reduce noise from other users. Power control is equivalent to lowering the volume of a loud pair of partygoers.

CDMA has been used commercially in wireless telephone ("cellular") and in other communications systems. Such cellular systems typically operate at between 800 MHz and 2 GHz, though the individual frequency bands may only be a few MHz wide. An attractive feature of cellular CDMA is the absence of any hard limit to the number of users in a given bandwidth, unlike FDMA and TDMA. The increased number of users in the transmission band merely increases the noise to contend with. However, as a practical matter, there is some threshold at which the "signal-to-noise" ratio becomes unacceptable. This signal-to-noise threshold places real constraints in commercial systems on the number of paying customers and/or data rates that can be supported.

CDMA has also been used in optical communications networks. Such optical CDMA (OCDMA) networks generally employ the same general principles as cellular CDMA. However, unlike cellular CDMA, optical CDMA signals are delivered over an optical network. As an example, a plurality of subscriber stations may be interconnected by a central hub with each subscriber station being connected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. An optical pulse is transmitted to a selected one of a plurality of potential receiving stations by coding the pulse in a manner such that it is detectable by the selected receiving station but not by the other receiving stations. Such coding may be accomplished by dividing each pulse into a plurality of intervals known as "chips". Each chip may have the logic value "1", as indicated by relatively large radiation intensity, or may have the logic value "0", as indicated by a relatively small radiation intensity. The chips comprising each pulse are coded with a particular pattern of logic "1"s and logic "0"s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, the optical network utilizes CDMA that is based on optical frequency domain coding and decoding of ultra-short optical pulses. Each of the transmitters includes an optical source for generating the ultra-short optical pulses. The pulses comprise N Fourier components whose phases are coherently related to one another. The frequency intervals around each of the N Fourier components are generally referred to as frequency bins. A "signature" is impressed upon the optical pulses by independently phase shifting the individual Fourier components comprising a given pulse in accordance with a particular code whereby the Fourier components comprising the pulse are each phase shifted a different amount in accordance with the particular code. The encoded pulse is then broadcast to all of or a plurality of the receiving systems in the network. Each receiving system is identified by a unique signature template and detects only the pulses provided with a signature that matches the particular receiving system's template.

The availability of variable spectral phase encoders/decoders or dynamic encoders/decoders (i.e., one capable of changing its coding state under user control) in OCDMA networks makes possible a variety of code-based network configurations and user-to-user connectivity configurations. For spectral-phase encoding, the number of possible orthogonal codes is equal to the number of frequency bins. Previous methods of producing an encoder capable of generating all N codes may have operated by: (1) physically switching in an entirely new phase mask (a relatively slow process), (2) incorporating a variable phase mask based on either mechanical adjustments of phase bins (via Micro-Electro-Mechanical devices (MEMs) or other mechanical means) or by means of liquid crystal phase modulators, (3) thermally rearranging the frequencies of integrated ring resonators to create new codes, or (4) using a bank of N fixed coders and two 1:N optical switches (before and after the bank of coders).

Options 2 through 4 may be reconfigured more rapidly than the physical mask replacement approach. Options 1 through 3 can function with a single coder unit but at best are expected to operate on millisecond time scales and typically require that all N elements of the phase mask are adjustable. While option 4 is in many ways the most straightforward and, being switch based, could be fast, the fact that it would require N fixed coders means that it will likely scale poorly with increasing N. As such, there is a need for a dynamic encoder that may be rapidly reconfigured and scalable as N increases.

SUMMARY OF THE INVENTION

In an aspect of the invention a spectral phase encoder is provided. The encoder includes a plurality of switches and at least one Walsh encoder coupled between a first switch and second switch of the plurality of switches, the first switch being operable to selectively route an optical signal to the Walsh encoder to apply a Hadamard sequence to the optical signal.

In another aspect of the invention, each switch among the plurality of switches is a 2×2 crossbar switch.

In yet another aspect of the invention, the spectral phase encoder further includes a third switch and a fourth switch.

In yet another aspect of the invention, the spectral phase encoder further includes at least one Walsh encoder coupled between the second switch and the third switch, at least one Walsh encoder coupled between the third switch and the fourth switch, and at least one Walsh encoder coupled after the fourth switch.

In yet another aspect of the invention, each of the first, second, third, and fourth switch is operable to selectively route the optical signal through a combination of the Walsh encoders to apply a Hadamard sequence to the optical signal.

In yet another aspect of the invention, the first switch, second switch, third switch, and fourth switch are 2×2 crossbar switches.

In yet another aspect of the invention, the spectral phase encoder further includes an additional 2×2 crossbar switch.

In yet another aspect of the invention, the spectral phase encoder further includes a passive coupler.

In an aspect of the invention a spectral phase encoder is provided. The encoder includes a plurality of switches and at least one Walsh encoder coupled between a first switch and second switch of the plurality of switches, the first switch being operable to selectively route an Hadamard encoded optical signal to the Walsh decoder to decode the optical signal.

In another aspect of the invention, each switch among the plurality of switches is a 2×2 crossbar switch.

In yet another aspect of the invention, the spectral phase decoder further includes a third switch and a fourth switch.

In yet another aspect of the invention, the spectral phase decoder further includes at least one Walsh decoder coupled between the second switch and the third switch, at least one Walsh decoder coupled between the third switch and the fourth switch, and at least one Walsh decoder coupled after the fourth switch.

In yet another aspect of the invention, each of the first, second, third, and fourth switch is operable to selectively route the optical signal through a combination of Walsh decoder to decode the Hadamard encoded optical signal.

In yet another aspect of the invention, the first switch, second switch, third switch, and fourth switch are 2×2 crossbar switches.

In yet another aspect of the invention, the spectral phase decoder further includes an additional 2×2 crossbar switch.

In yet another aspect of the invention, the spectral phase decoder further includes a passive coupler.

BRIEF DESCRIPTION OF THE DRAWINGS

A more complete appreciation of the subject matter of the present invention and the various advantages thereof can be realized by reference to the following detailed description in which reference is made to the accompanying drawings wherein like reference numbers or characters refer to similar elements.

FIG. 3 illustratively depicts a one realization of a Walsh encoder in an aspect of the invention;

DETAILED DESCRIPTION OF THE INVENTION

Figure 1:
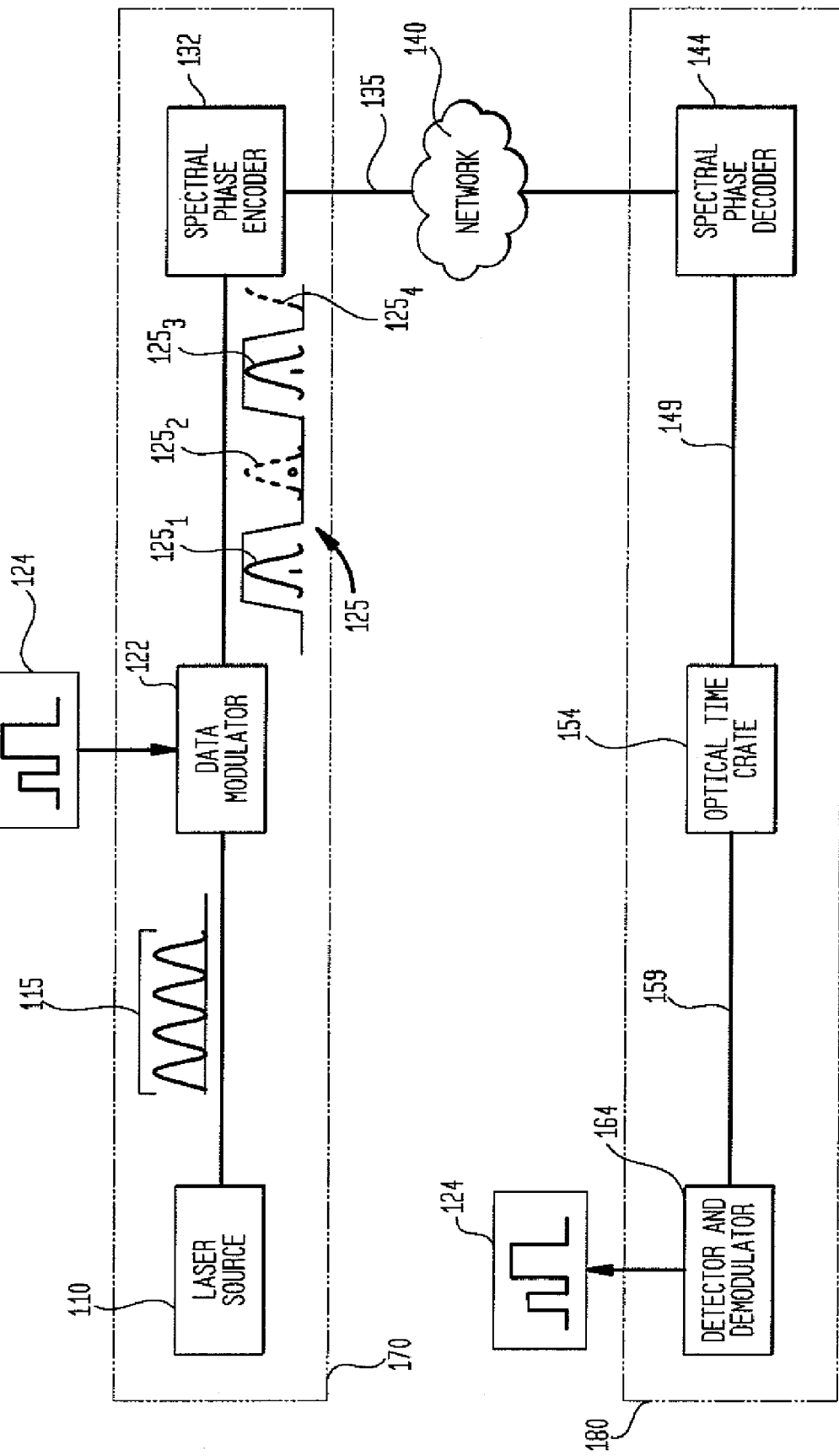
FIG. 1 illustratively depicts a system in accordance with an aspect of the present invention.

FIG. 1 illustratively depicts a system 100 in accordance with an aspect of the present invention. The system comprises a laser source 110 that generates a sequence of optical pulses 115 that are fed to a data modulator 120. The data modulator 122 also receives a data stream 122 that is used to modulate the sequence of optical pulses 115. The modulation data preferably comprises a digital data stream generated by a subscriber or user station 124. In a preferred embodiment, the data modulator 122 comprises an ON/OFF keyed data modulator wherein a "1" symbol or bit in the digital data stream corresponds to the presence of an optical pulse and a "0" symbol or bit corresponds to the absence of an optical pulse.

In this way, each pulse represents a bit of information. For example, a modulated stream 125 is shown where the digital data stream comprises a "1010" data sequence. As shown, each time slot with the bit "1" will result in the presence of an optical pulse (125₁ and 125₃), whereas each time slot with a "0" bit indicates the absence of an optical pulse (125₂ and 125₄), which are shown as dashed lines to indicate their absence.

The modulated data stream 125 is then fed to a spectral phase encoder 132. As is discussed in further detail below, the spectral phase encoder 132 applies a phase code associated with a user to each optical pulse in the data stream to produce an encoded data stream 135. The phase code operates to provide a "lock" so that only a corresponding phase decoder with the appropriate "key" or phase conjugate of the phase code of the spectral phase encoder may unlock the encoded data stream. Typically, a spectral phase encoder is associated with a particular user and therefore allows only another user with the appropriate key to decode or receive information from the particular user. The information appears as noise to users that do not have the appropriate key.

The encoded data stream 135 may then be transported over a network 140, such as Wavelength Division Multiplex (WDM) network for example, to a spectral phase decoder 144 that, preferably, applies the phase conjugate of the phase code of the spectral phase encoder 132, as discussed above. The spectral phase decoder 144 provides a decoded data stream 149 to an optical time gate 150. The spectral phase decoder works in a manner similar to that of the spectral phase encoder as will be described below. The optical time gate 154 operates to reduce multiple access interference by temporally extracting only a desired user channel from among the decoded stream. The optical time gate 154 produces a user data stream 159, which is fed to a data demodulator 164. Where ON/OFF keying was employed at the transmitting end, the data demodulator 164 comprises an amplitude detector that reproduces the digital data stream 124.

In accordance with an aspect of the present invention, the laser source 110, data modulator 122 and spectral phase encoder 132 may comprise a transmitting station 170 associated with a user. The spectral phase decoder 144, optical time gate 154 and demodulator 164 may preferably comprise a receiving station 180 associated with a user.

The spectral phase encoder may utilize a set of Hadamard codes, which are orthogonal and binary, by breaking each Hadamard code into a multiplicative series of codes. An example of a multiplicative series of codes that span the set of Hadamard code is the set of Walsh codes. Note that the Walsh codes form a proper subset of the Hadamard codes. It should be noted that many (but not all) other sub-groups of size $\log_2$ (N) selected from the Hadamard codes also form a multiplicative basis that can span the complete set of Hadamard codes. Any of these spanning groups can be used as the basis for the variable Hadamard coder and we focus here on the Walsh subset for specificity.

Hadamard codes can achieve relatively high spectral efficiency with minimal multi-user interference (MUI). This coding scheme offers orthogonally in the sense that MUI is zero at the time that the decoded signal is maximum. The number of orthogonal codes is equal to the number of frequency bins; hence, relatively high spectral efficiency is possible. Binary Hadamard codes are converted to phase codes by assigning to +1's and −1's phase shifts of 0 and π, respectively. To encode data, which contains a spread of frequencies, as opposed to the unmodulated pulse stream, which contains only the initial comb of frequencies produced by a mode locked laser (MLL), it is preferable to define frequency bins around the center frequencies. Encoding data then consists of applying the phase shift associated with a frequency to the entire bin. The output of the phase encoder is then a signal obtained by summing the phase-shifted frequency components of the modulated signal, or equivalently, by convolving the modulated optical signal at the input of the phase encoder with the inverse Fourier transform of the phase code. Breaking down the Hadamard code into a sequence of Walsh codes allows for the development of an encoder/decoder that can be implemented in relatively small time scales as discussed below.

Figure 2:
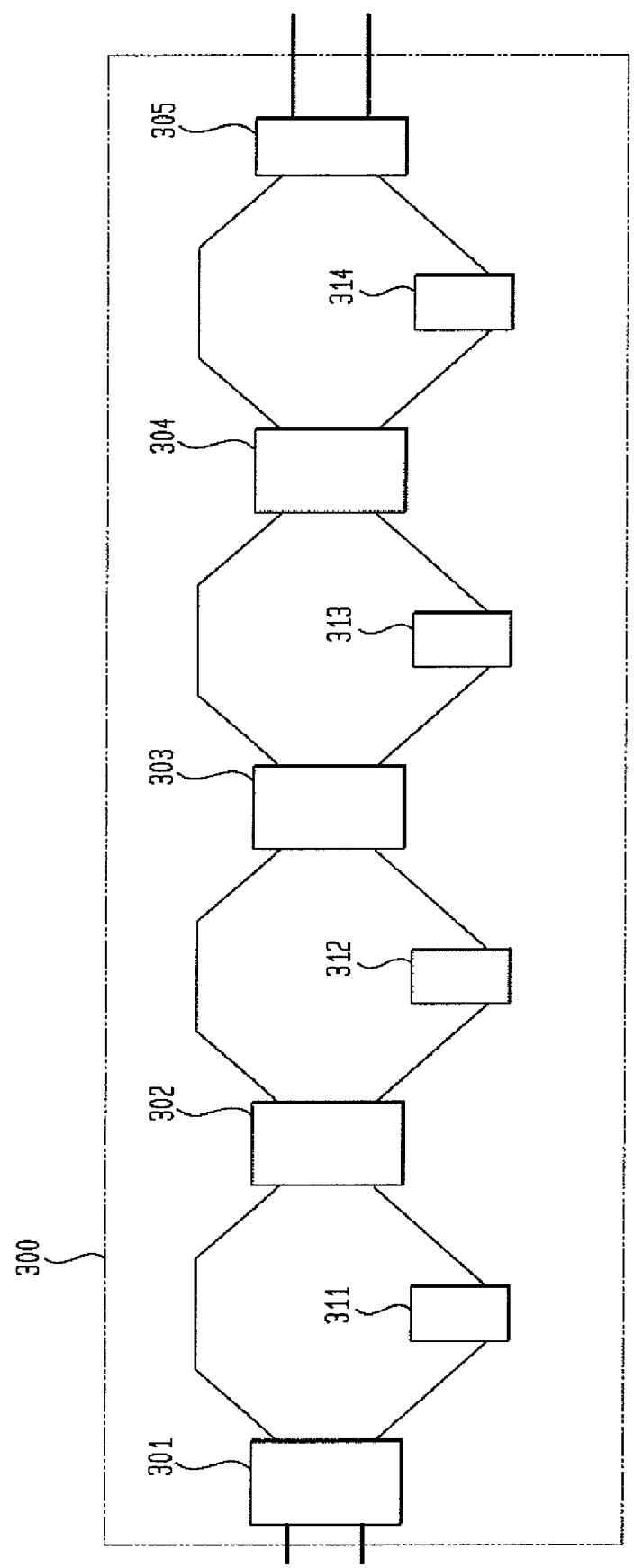
FIG. 2 illustratively depicts a spectral phase encoder-switch cascade in accordance with an aspect of the present invention.

In an aspect of the present invention the spectral phase encoder is implemented as a dynamic coder that is desirably reconfigurable at the microsecond to nanosecond time scales. In addition, the number of adjustable elements required to span a code space of N codes grows as $\log_2$ (N) rather than as N. The adjustable elements in such coder are not based on λ-scale adjustments of the phase mask, but instead function as optical 2×2 switches arranged in a cascade with fixed Walsh coders. FIG. 2 shows an example of such a variable encoder. As shown in FIG. 2, encoder 300 includes a cascade of switches 301, 302, 303, and 304 and Walsh coders 311, 312, 313, and 314. Each switch is a 2×2 optical crossbar switch that routes or directs a signal into one or more of the Walsh coders to encode a signal with a particular Hadamard code. Switch 301 can be set so that an incoming signal can bypass Walsh coder 311 or pass through Walsh coder 311. Switch 302 can be set so that an incoming signal can bypass Walsh coder 312 or pass through Walsh coder 312. Switch 303 can be set so that an incoming signal can bypass Walsh coder 313 or pass through Walsh coder 313. Switch 304 can be set so that an incoming signal can bypass Walsh coder 314 or pass through Walsh coder 314. As such, switches 301, 302, 303, and 304 are used to direct the signal to either bypass their respective Walsh coders or to pass through their respective Walsh coders thereby applying a Hadamard code to the signal.

Although optical switching is usually fast enough to operate on the time scale of bits or perhaps packets and with a significant reduction in the number of adjustable elements, the encoder 300 if FIG. 2 could simplify the task of using bit-by-bit code state changes to perform data modulation (code-shift keying).

The spectral phase encoder 300 generally works under the principle that Hadamard codes of order N, $H_n$, where n∈1 ... N, can be decomposed into products of a smaller basis set of Walsh codes $W_m$ of length N where the maximum number of Walsh codes required to reconstruct any of these N Hadamard code is $\log_2$ (N). Walsh codes exist for only certain values of m, specifically for $m=2^{p-1}$ where p∈1 ... $\log_2$ (N) and m=0.

The Walsh codes, like the Hadamard codes, are of length N and all the elements are either +1 or −1. In general, the $n^{th}$ code $W_n$ of length N is characterized by alternating blocks of +1's and −1's where the length of the blocks is given by n. Thus for order N=16, the Walsh codes are as discussed below.

$W_8$ consisting of eight +1's followed by eight −1's (+ + + + + + + + − − − − − − − −).

$W_4$ consisting of two sets of four +1's and four −1's. (+ + + + − − − − + + + + − − − −).

$W_2$ consisting of four sets of two +1's and two −1's. (+ + − − + + − − + + − − + + − −).

$W_1$ consisting of eight sets of +1's and −1's. (+ − + − + − + − + − + − + − + −).

$W_0$ consisting of all 1's (+ + + + + + + + + + + + + + + +).

In general, the $i^{th}$ element of Hadamard code n of order N as the following product of the $i^{th}$ elements of the Walsh codes, also of order N can be written as:

$$H_{n,i} = W_{0,i} \prod_{j=1}^{log_2(N)} (W_{2^{j-1},i})^{b_j},$$

where $b_j$ is $j^{th}$ digit of the binary representation of (n−1). As a specific example, any of the 16 codes available in $H_{16}$ can be expressed as a product of $W_1$, $W_2$, $W_4$, and $W_8$ (which may correspond to Walsh coders 314, 313, 312, and 311 respectively). The 16 Hadamard codes of order 16 can be represented as:

| | | | |
|---|---|---|---|
| $H_1 = W_0$ | $H_2 = W_1$ | $H_3 = W_2$ | $H_4 = W_2 * W_1$ |
| $H_5 = W_4$ | $H_6 = W_4 * W_1$ | $H_7 = W_4 * W_2$ | $H_8 = W_4 * W_2 * W_1$ |
| $H_9 = W_8$ | $H_{10} = W_8 * W_1$ | $H_{11} = W_8 * W_2$ | $H_{12} = W_8 * W_2 * W_1$ |
| $H_{13} = W_8 * W_4$ | $H_{14} = W_8 * W_4 * W_1$ | $H_{15} = W_8 * W_4 * W_2$ | $H_{16} = W_8 * W_4 * W_2 * W_1$ |

The sum of the Walsh indices equals one less than the corresponding Hadamard code index. Thus the settings for the 2×2 switches (i.e., cross or bar state) to set the coder to Hadamard code n are obtained by converting (n−1) to a binary number. For example, as shown in FIG. 2, if n=14, (n−1) =13=(1 1 0 1)$_{base\,2}$ and the switches 301 and 302 would be set such that the signal passes through Walsh coders 311 and 312. Switch 303 would be set so that the signal bypasses Walsh coder 313 and switch 304 would be set so that signal passes through Walsh coder 314.

FIG. 3 shows an example of a Walsh coder 400 in accordance with an aspect of the invention. As shown in FIG. 3, an optical signal enters a collimated lens 401. The optical signal passes through space 403 toward a gradient reflective coating 404. Space 403 may be an air gap or it may be filled with a glass substrate. Gradient reflective coating 404 may be a metallic coating such as silver or aluminum which is highly-reflective/low-transmissive near the collimating lens (where the light is bright) and tapers off to low-reflectance/high-transmittance further from the lens. The intention is that each bounce should transmit an equal amount of light. The coating allows a portion of the optical signal to pass through and reflects the other portion through space 403 toward a 100% reflective material. The portion(s) of the optical signal that pass through coating 404 are directed toward a Fourier lens 405. Fourier lens 405 converts the incoming signal into the frequency domain and directs the converted signal onto a reflective phase mask 406 as shown in FIG. 3. Reflective phase mask 406 corresponds to the respective Walsh code.

Figure 4D:
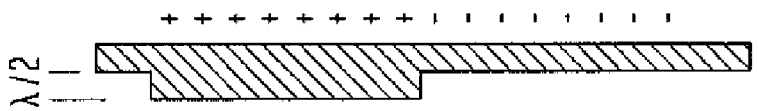
FIGS. 4A through 4D illustratively depict reflective phase masks in accordance with an aspect of the invention.
Figure 4C:
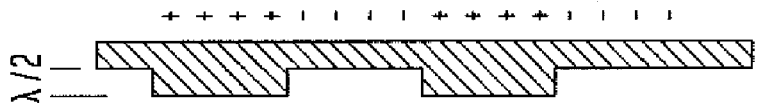
Figure 4B:
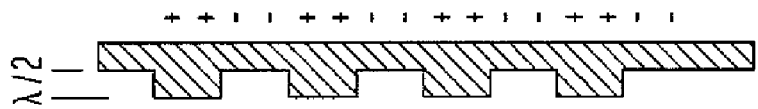
Figure 4A:
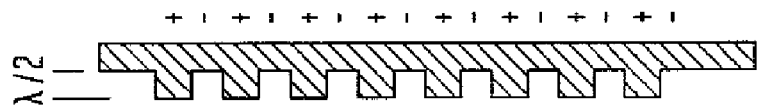

Reflective phase mask is different for each Walsh coder. For instance, as shown in FIG. 4A, for Walsh coder $W_8$, the phase mask would be set at a height $\lambda/2$ for 8 bits and then changed back to the base level. As shown in FIG. 4B, for Walsh coder $W_4$, the phase mask would be set at height $\lambda/2$ for 4 bits and then changed back to the base level for 4 bits. This pattern is then repeated one more time. As shown in FIG. 4C, for Walsh coder $W_2$, the phase mask would be set at height $\lambda/2$ for 2 bits and then changed back to the base level for 2 bits. This pattern is then repeated three more times. As shown in FIG. 4D, for Walsh coder $W_1$, the phase mask would alternate in between height $\lambda/2$ and the base height for a total length of 16 bits.

Physically, any given Walsh function can be implemented by phase coders of the type contemplated for standard Hadamard codes and the successive products of the Walsh codes correspond to passing through the corresponding Walsh coders in cascade (in any order). Although FIG. 2 shows Walsh coders W8, W4, W2, and W1 (311, 312, 313, and 314 respectively) in that particular order, that order may be changed to any combination such as W8, W1, W4, and W2 for example.

All of the N codes of Hadamard N can be reproduced in a cascaded structure of $log_2$ (N) fixed Walsh coders interspersed with $log_2$ (N) 2×2 optical crossbar switches as shown in FIG. 2 for the case N=16. The switches route the signal through the following stage in the Walsh cascade or cause the signal to bypass that stage. Each of the 16 possible states of the 4 switches corresponds to one of the 16 Hadamard codes. For example, if all four switches are in the "bar" state, the input signal bypasses all four Walsh coders 311, 312, 313, and 314, emerges unchanged, and the cascade is equivalent to $H_1$. If all four switches are in the "cross state" the signal passes through Walsh coder 311, bypasses Walsh coder 312, passes through Walsh coder 313, and bypasses Walsh coder 314. The net effect is equivalent to $W_8 * W_2 = H_{11}$.

At the rightmost edge of the cascade, element 305 may be a passive coupler (which introduces an additional 3 dB loss) or an additional crossbar switch which may reduce the signal loss by connecting the output port to the active branch of the previous state; in short, the state of the rightmost switch (element 305) would match the state of the switch 304.

Figure 5:
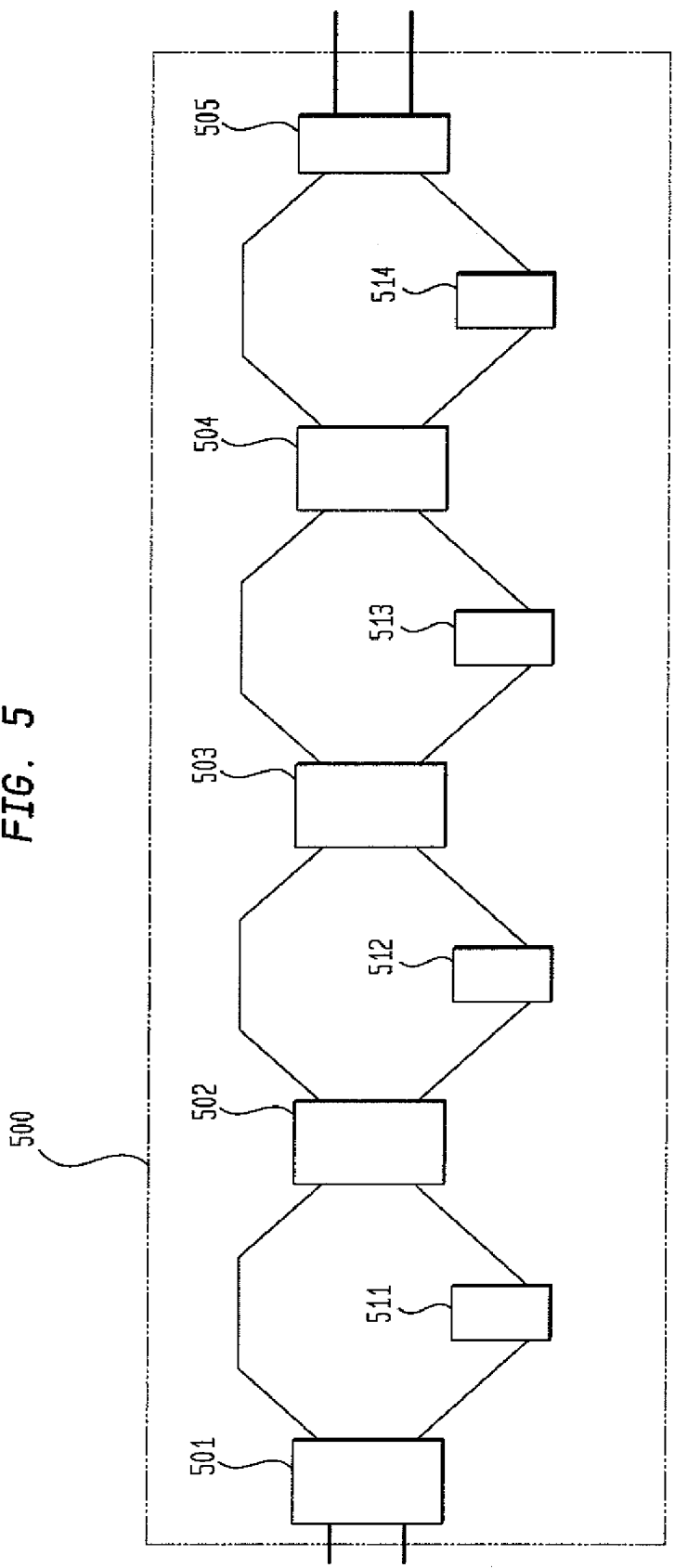
FIG. 5 illustratively depicts a Walsh decoder in an aspect of the invention.

If this final crossbar switch is included, the configuration above could serve as a dual-code coder by using both of the inputs on the left and both of the outputs on the right. Consider a situation where all of the crossbar switches are set such that the uppermost bypass branch is selected. In this case, signals entering the upper input port emerge from the upper output port after having code $H_1 = W_0$ applied to them (unchanged). For that same configuration of the cascade, signals entering the lower input port will be guided through all four Walsh coders and emerge at the lower output port after having code $H_{16} = W_8 * W_4 * W_2 * W_1$ applied to them (note, this signal could also counter-propagate through the cascade). In general, when the cascade is set to code Hadamard code m on the upper branch, it is simultaneously set to code Hadamard code (N−m+1) on the lower branch. This implies that Hadamard codes m and (N−m+1) are complementary codes in the sense that their binary representations in Walsh projection are bit-wise inverted. Consider a scenario in which a user is assigned two such complementary codes A and B to use to represent 1 or 0 (code-shift keying/modulation). Using a rapidly tunable variable coder, this user launches a continuous sequence of A or B coded pulses to convey his data. (The use of two codes provides greater signal obscurity.) At the receiver end, a variable decoder cascade, for example, as shown in FIG. 5, would be set to the A/B complement. If the received signal is split and launched into both input ports, the cascade will operate such that the A pulses are decoded at one output port and the B pulses are decoded at the other output port in a natural setup for differential detection of a code-shift-keyed transmission.

The different paths through the spectral phase encoder 300 may, for different Hadamard codes, cause the signals to incur different losses and different levels of bin edge filtering effects. Although not shown, encoder 300 may include mediation measures such as in-line amplifiers at each stage, lumped losses in the bypass legs or a single gain-clamped amplifier to compensate for the loss variations.

For full generality $log_2$ (N) Walsh coders are needed, but for some subsets of the Hadamard codes, the cascade depth might be reduced. For example, if the variable coder need only provide access to odd-numbered Hadamard codes, the $W_1$ stage of the cascade could be eliminated. If the variable coder need only provide access to even-numbered Hadamard codes, the $W_1$ stage of the cascade need not be switched. If the variable coder need only provide access to Hadamard codes for n<9, the $W_8$ stage of the cascade could be eliminated.

Finally, this approach is not limited to the standard real-valued (+1, −1) codes. There exists at least one variety of complex generalizations of the Hadamard code that can be implemented via augmenting the cascade. These generalize Hadamard codes $G_N$ retain the desired orthogonality property of Hadamard codes and are obtained by pre-multiplying and/or post-multiplying the Hadamard matrix by monomial matrices with complex elements according to $G_N = M1_N * H_N * M2_N$. If the monomial matrices $M1_N$ and $M2_N$ are diagonal, they can each be physically realized by a fixed complex phase coder (i.e., with a complex phase mask). If these coders precede the cascade and follow the cascade (in appropriate sequence), the N different $G_N$ codes can be accessed by the same $\log_2$ (N) switching elements as above.

Although the above description describes how a spectral phase encoder 300 works, the same principles apply for a spectral phase decoder 500 illustrated in FIG. 5. An incoming encoded data stream 135 from network 140 is applied to the spectral phase decoder 500. The spectral phase decoder 500 or 144 applies the phase conjugate of the coders applied in the spectral phase encoder 300 or 132. For the special case of Walsh-Hadamard codes, where every phase element is either +1 or −1, each code is its own conjugate. As such, the spectral phase encoder may also be used as a spectral phase decoder when using Walsh-Hadamard codes. Using any combination of Walsh coders, the spectral phase decoder 500 may reproduce the phase conjugate of all of the N Hadamard codes in order to decode the encoded data stream.

FIG. 5 shows an example of such a decoder. As shown in FIG. 5, decoder 500 includes a cascade of switches 501, 502, 503, and 504 and coders 511, 512, 513, and 514. Coders 511, 512, 513, and 514 of decoder 500 are phase conjugates of coders 311, 312, 313, and 314 in encoder 300. Each switch is a 2×2 optical crossbar switch that routes or directs a signal into one or more of the coders to encode a signal with a particular Hadamard code. Switch 501 can be set so that an incoming signal can bypass coder 511 or pass through coder 511. Switch 502 can be set so that an incoming signal can bypass coder 512 or pass through coder 512. Switch 503 can be set so that an incoming signal can bypass coder 513 or pass through coder 513. Switch 504 can be set so that an incoming signal can bypass coder 514 or pass through coder 514. As such, switches 501, 502, 503, and 504 are used to direct the signal to either bypass their respective coders or to pass through their respective coders thereby decoding the signal. At the rightmost edge of the cascade, element 505 may be a passive coupler (which introduces an additional 3 dB loss) or an additional crossbar switch which may reduce the signal loss by connecting the output port to the active branch of the previous state; in short, the state of the rightmost switch (element 505) would match the state of the switch 504.

In a single-stage variable encoder, as the order N of the Hadamard matrix increases, the number of phase elements which must be controlled grows linearly with N while the number of switch elements which must be controlled in the variable cascade grows as $\log_2$ (N).

Second, optical switch technology promises to be faster than either MEMS-based, liquid-crystal-based, or thermal phase adjustments and could make this approach suitable for situations in which the code must be changed on a rapid timescale.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed:

1. A variable spectral phase encoder comprising:
   a plurality of switches;
   at least one encoder coupled between a first switch and second switch of the plurality of switches, the first switch being operable to selectively route an optical signal to the encoder to apply a Hadamard sequence to the optical signal;
   a third switch and a fourth switch;
   at least one encoder coupled between the second switch and the third switch;
   at least one encoder coupled between the third switch and the fourth switch; and
   at least one encoder coupled after the fourth switch.

2. The spectral phase encoder according to claim 1, wherein each of the first, second, third, and fourth switch is operable to selectively route the optical signal through a combination of the encoders to apply a Hadamard sequence to the optical signal.

3. A spectral phase decoder comprising:
   a plurality of switches;
   at least one decoder coupled between a first switch and second switch of the plurality of switches, the first switch being operable to selectively route an Hadamard encoded optical signal to the decoder to decode the optical signal;
   a third switch and a fourth switch;
   at least one decoder coupled between the second switch and the third switch;
   at least one decoder coupled between the third switch and the fourth switch; and
   at least one decoder coupled after the fourth switch.

4. The spectral phase decoder according to claim 3, wherein each of the first, second, third, and fourth switch is operable to selectively route the optical signal through a combination of decoder to decode the Hadamard encoded optical signal.

* * * * *